US 7,840,729 B2

(12) United States Patent
Inoue et al.

(10) Patent No.: US 7,840,729 B2
(45) Date of Patent: Nov. 23, 2010

(54) RECORDING MEDIUM ACCESS DEVICE AND RECORDING MEDIUM ACCESS METHOD

(75) Inventors: Shinji Inoue, Osaka (JP); Kazuya Fujimura, Nara (JP); Yukiko Inoue, Osaka (JP); Takuji Maeda, Osaka (JP); Makoto Ochi, Osaka (JP); Masato Suto, Osaka (JP); Hirokazu So, Osaka (JP)

(73) Assignee: Panasonic Corporation, Kadoma-Shi, Osaka (JP)

( * ) Notice: Subject to any disclaimer, the term of this patent is extended or adjusted under 35 U.S.C. 154(b) by 833 days.

(21) Appl. No.: 10/579,803

(22) PCT Filed: Nov. 18, 2004

(86) PCT No.: PCT/JP2004/017170

§ 371 (c)(1),
(2), (4) Date: Mar. 15, 2007

(87) PCT Pub. No.: WO2005/050432

PCT Pub. Date: Jun. 2, 2005

(65) Prior Publication Data

US 2007/0174547 A1     Jul. 26, 2007

(30) Foreign Application Priority Data

Nov. 19, 2003    (JP)    ............................. 2003-389108

(51) Int. Cl.
*G06F 13/12*    (2006.01)

(52) U.S. Cl. ................... 710/74; 710/5; 710/8; 710/14; 710/15; 710/62

(58) Field of Classification Search ........................ None
See application file for complete search history.

(56) References Cited

U.S. PATENT DOCUMENTS 6,493,787 B1    12/2002  Yamamoto et al.
6,993,690 B1 *   1/2006  Okamoto .................... 714/718

(Continued)

FOREIGN PATENT DOCUMENTS

JP        63-159460 U    10/1988

(Continued)

OTHER PUBLICATIONS

"Information Technology-Volume and File Structure of Disk Cartridges for Information Interchange", Nov. 1994, pp. 1-40, second edition, ISO/IEC 9293, ISO/IEC, Switzerland.

(Continued)

*Primary Examiner*—Eron J Sorrell
(74) *Attorney, Agent, or Firm*—Smith Patent Office

(57) ABSTRACT

A semiconductor memory card (101) has a plurality of areas (105, 106) based on different file systems. An adapter (102) includes: an area switching part (110) which a user can operates, a determination part (109) for determining the operation; and a card controller (108) for issuing a switching command for switching the area to be used for the semiconductor memory card (101) in accordance with the judgment result. When the switching command is issued in response to input from the area switching part (110), the command is interpreted by an area selector (107) of the semiconductor memory card (101) so as to select an area.

25 Claims, 15 Drawing Sheets

U.S. PATENT DOCUMENTS

| | | |
|---|---|---|
| 6,994,263 B2 * | 2/2006 | Ueda et al. .................. 235/492 |
| 2003/0109179 A1 | 6/2003 | Kaneshiro et al. |
| 2003/0137887 A1 | 7/2003 | Nakabe et al. |
| 2003/0163620 A1 * | 8/2003 | Minami et al. ................ 710/62 |
| 2004/0123059 A1 | 6/2004 | Suda |
| 2006/0069925 A1 * | 3/2006 | Nakai et al. ................. 713/193 |

FOREIGN PATENT DOCUMENTS

| | | |
|---|---|---|
| JP | 6-195524 A | 7/1994 |
| JP | 8-272541 A | 10/1996 |
| JP | 10-116329 A | 5/1998 |
| JP | 2000-259783 A | 9/2000 |
| JP | 2001-290708 A | 10/2001 |
| JP | 2001-306182 A | 11/2001 |
| JP | 2003-233795 A | 8/2003 |
| JP | 2003-288564 A | 10/2003 |
| JP | 2004-86503 A | 3/2004 |

OTHER PUBLICATIONS

"OSTA Universal Disk Format Specification", Feb. 1997, pp. 1-112, revision 1.50, Optical Storage Technology Association, Santa Barbara, USA.

* cited by examiner

RECORDING MEDIUM ACCESS DEVICE AND RECORDING MEDIUM ACCESS METHOD

TECHNICAL FIELD

The present invention relates to a recording medium access device for accessing a recording medium capable of performing a plurality of operations and relates to a recording medium access method.

BACKGROUND ART

There are various types of recording mediums for recording digital data such as music contents and video data, including magnetic disks, optical disks, magneto-optical disks, etc. A semiconductor memory card as a kind of the recording mediums uses a semiconductor memory such as a flash ROM as a recording device. For miniaturization of the recording medium is progressing, the semiconductor memory card has rapidly widespread especially in compact portable equipment such as digital still cameras and mobile phone terminals.

An example of the semiconductor memory card is a semiconductor memory card having a copyright protection function so as to store digital copyrighted works therein (refer to Patent document 1, for example). To protect copyright of digital works, this semiconductor memory card is characterized by having an authentication area where an external device is permitted to access only when authentication of the external device succeeds and a non-authentication area where an external device is permitted to access, irrespective of the authentication result.

On the other hand, data stored in the semiconductor memory card is managed by a file system and the user can easily handle the stored data as a file. Conventionally used file systems include a FAT file system (for details, refer to Non-patent document 1). The FAT file system is a file system generally used in information equipment such as PC. The FAT file system centrally manages location of data constituting the file by using a table called as a FAT (File Allocation Table). When the data stored in the semiconductor memory card is managed by the FAT file system, devices capable of interpreting the FAT file system can access the data stored in the semiconductor memory card and thus data can be transmitted or received between the devices through the semiconductor memory card.

However, file systems include an UDF (Universal Disk Format) file system (for details, refer to Non-patent document 2) and NTFS file system (New Technology File System) in addition to the FAT file system. When file systems which the devices can interpret are different from each other, the devices cannot transmit or receive data to or from each other through the semiconductor memory card.

Conventionally, as a method of solving the above-mentioned problem, a method of providing an area for storing a plurality of pieces of file system management information and area for storing common file data in information recording medium has been proposed (refer to Patent document 2, for example). According to the conventional method, after the information recording medium is inserted into the device, a file system to be used is selected and setting a starting address of the area in which the corresponding file system management information is stored as an address 0, the file system management information is accessed. By selecting one of the plurality of pieces of the file system management information in this manner and using it, data can be transmitted or received between different devices that interpret different file systems through the common information recording medium.

Patent document 1: Japanese Unexamined Patent Publication 2003-233795

Patent document 2: Japanese Unexamined Patent Publication Hei8-272541

Non-patent document 1: ISO/IEC9293, "Information Technology-Volume and File Structure of Disk Cartridges for Information", 1994

Non-patent document 2: OSTA "Universal Disk Format Specification Revision 1.50", 1997

DISCLOSURE OF INVENTION

Problems to be Solved by the Invention

However, the above-mentioned prior art has the following problems. According to the conventional area management method, a plurality of pieces of file system management information are respectively stored in accordance with file system types and only a set of file data common to each file system is stored. Thus, when the file having the same data are handled by the different file system, a plurality of substances of the data need not be stored, thereby enabling the information recording area to be reduced. However, in this method, in editing the file, it is necessary to change the plurality of pieces of file management information at a time, and the file can be edited only in the devices capable of interpreting all of the file system management information.

As means to solve the problem, it is considered that an area of the semiconductor memory card is divided into a plurality of areas and that different areas are managed by different file systems. In this case, in the conventional semiconductor memory card having the authentication area and the non-authentication area, each area is divided into two areas. As a result, at least four areas coexist in the semiconductor memory card and switching processing of these areas becomes complicated.

As the capacity of the semiconductor memory card is increased, other different specifications are required. For example, the specifications can realize that a large volume of video data is written at a high rate and that a lot of files of a relatively small size are written at the high speed. It is extremely difficult to achieve these performances by a single architecture or interface. Therefore, since a mechanism of partially changing behaviors in the semiconductor memory card in response to specific requests is required, control of the card becomes more complicated.

In consideration of the above-mentioned problem, the present invention intends to provide a method for dynamically or statically switching an interface for the card in response to the user's request.

Means to Solve the Problems

The present invention is a recording medium access device for accessing a recording medium having a plurality of functions comprising: a switching part that can be operated from the outside; and a card controller for issuing a switching command to switch an operation of said recording medium to the attached recording medium according to an operation to said switching part.

Further, the present invention is a recording medium access method in a recording medium access device for accessing a recording medium having a plurality of functions comprising: a switching step of detecting an input operation from the outside; and a card control step of issuing a switching command to switch an operation of said recording medium to the attached recording medium when said switching step is operated.

EFFECTS OF THE INVENTION

According to the present invention, a recording medium having various switching functions can be used very conveniently while being switched in line with the user's wishes.

DESCRIPTION OF REFERENCE NUMERALS

Figure 1:
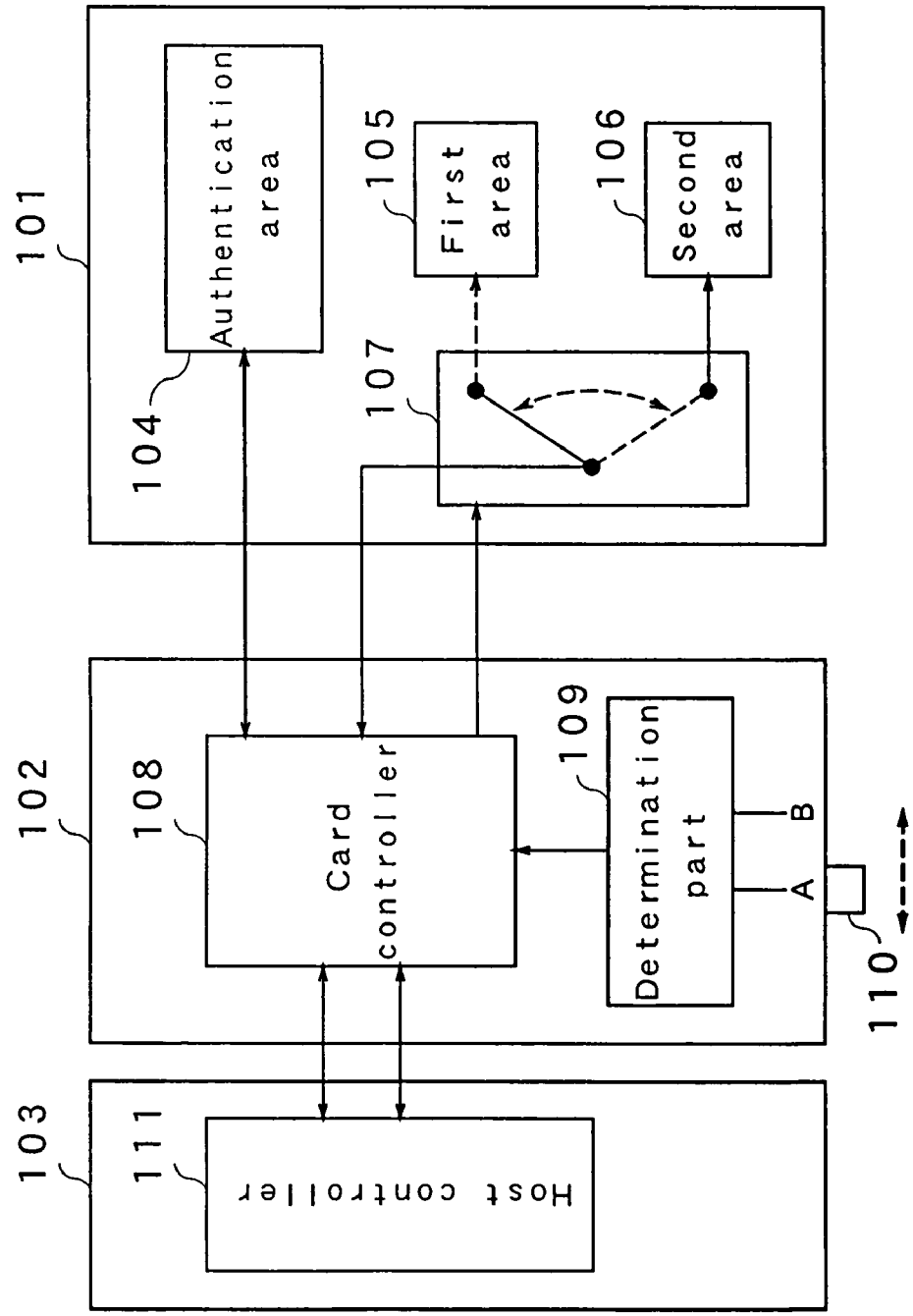
FIG. 1 is a block diagram showing a configuration of a semiconductor memory card and an access device in accordance with embodiment 1 of the present invention.

101 Semiconductor memory card
102 Adapter
103 Host
104 Authentication area
105 First area
106 Second area
107 Area selection part
108 Card controller
109 Determination part
110 Area switching part
111 Host controller
401 Semiconductor memory card
402 Adapter
403 Host
404 Authentication area
405 First area
406 Second area
407 Area selection part
408 Card controller
409 Switch notification part
410 Area switching part
411 Host controller
601 Semiconductor memory card
602,620,630 Adapter
603 Host
604 Authentication area
605 First area
606 Second area
607 Area selection part
608 Card controller
609 Switch notification part
610,621,631 Area switching part
611 Host controller
612 Switch notification part
613 Area switching part
801 Semiconductor memory card
802 Host
803 Authentication area
804 First area
805 Second area
806 Area selection part
807 Host controller
808 Switch notification part
809 Area switching part
1001 Semiconductor memory card
1002 Adapter
1003 Host
1004 Authentication area
1005 First area
1006 Second area
1007 Area selection part
1008 Card controller
1009 Switch notification part
1010 Area switching part
1011 Notification determination part
1012 Area information storage part
1013 Host controller
1201 Semiconductor memory card
1202 Adapter
1203 Host
1204 Authentication area
1205 First area
1206 Second area
1207 Switch controller
1208 Card controller 1209 Switch notification part
1210 Switching part
1211 Notification determination part
1212 State information storage part
1213 Host controller
1214 State information display part

BEST MODE FOR CARRYING OUT THE
INVENTION

Hereinafter, a recording medium and recording medium access device according to the present invention will be described with reference to figures.

Embodiment 1

FIG. 1 is a configuration view of a semiconductor memory card and an access device in accordance with embodiment 1 of the present invention. A semiconductor memory card 101 is a recording medium in the present embodiment. The semiconductor memory card 101 is configured to include an authentication area 104, a first area 105, a second area 106 and an area selection part 107. The authentication area 104 is an area in which secret information such as copyright information and personal information is stored, for example, which is used for storing the encryption key for encoding an electronic data whose copyright needs to be protected and a further encoded encryption key using a specific numerical value as a key. The first area 105 is an area managed by a specific file system and the second area 106 is an area managed by a file system that is different from the file system managing the first area 105. The area selection part 107 switches the area to be used between the first area 105 and the second area 106 according to an external instruction such as a command.

A host 103 is an information processing device that uses the semiconductor memory card 101. The host 103 has a host controller 111. Description of the other components is omitted.

An adapter 102 is a recording medium access device in the present embodiment for connecting the host 103 to the semiconductor memory card 101. The adapter 102 is configured to include a card controller 108, a determination part 109 and an area switching part 110. On the basis of a determination result of the determination part 109, the card controller 108 switches between the areas in the semiconductor memory card 101 and relays signals of the host 103 and semiconductor memory card 101. The determination part 109 detects the state of the area switching part 110 at initialization and determines whether or not the area in the semiconductor memory card 101 needs to be switched. The area switching part 110 is a switch for performing an operation of switching the area to be used in the semiconductor memory card 101.

Figure 2:
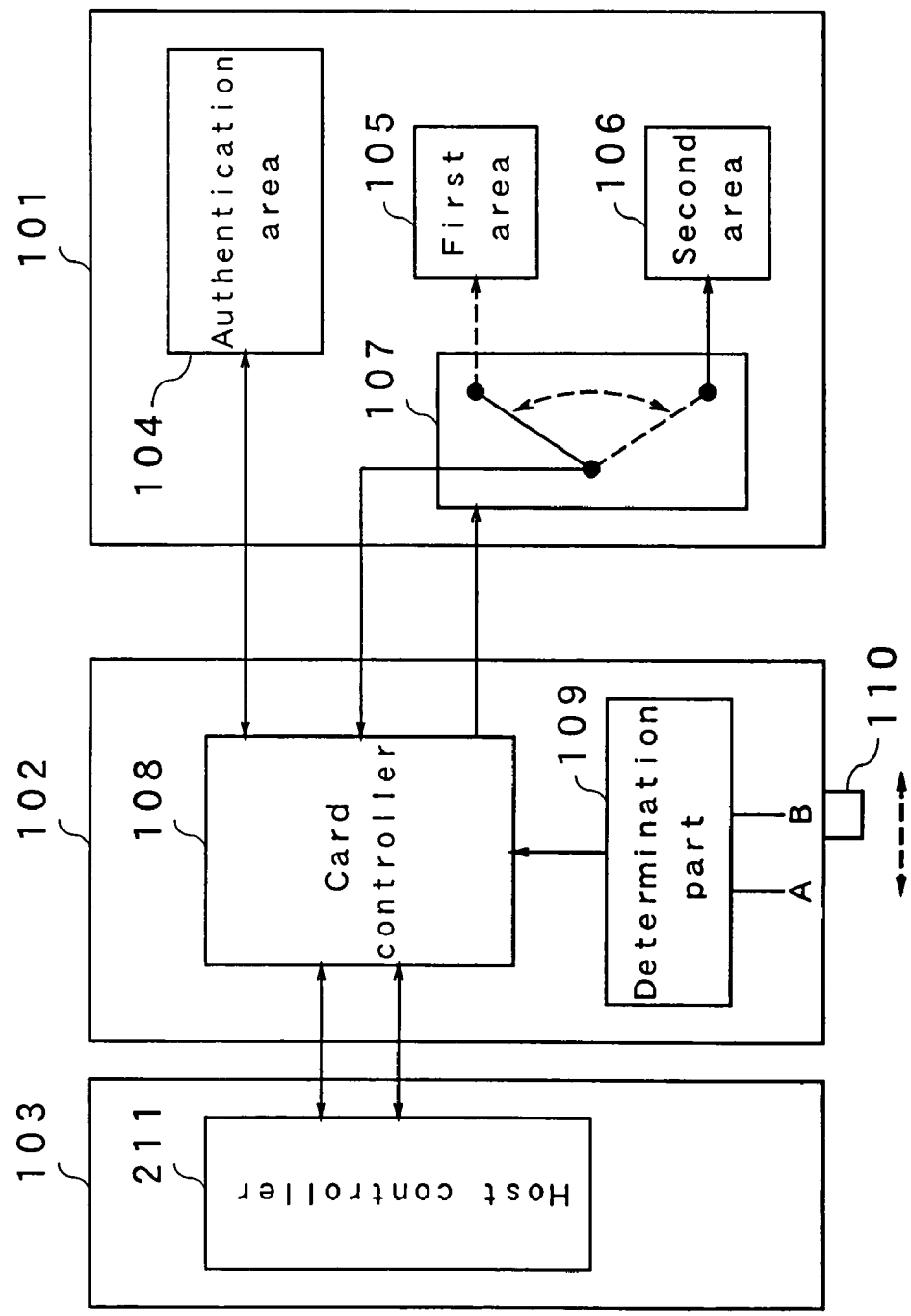
FIG. 2 is a block diagram showing another example of the operation state in the semiconductor memory card and access device in accordance with embodiment 1 of the present invention.

In FIG. 1, the area switching part 110 is set at the side of A, which shows the state where the first area 105 in the semiconductor memory card 101 is selected. In FIG. 2, the area switching part 110 is set at the side of B, which shows the state where the second area 106 in the semiconductor memory card 101 is selected.

When an access to the authentication area 104 in the semiconductor memory card 101 is made, mutual authentication between the host 103 or adapter 102 and semiconductor memory card 101 is carried out. The access can be made only when mutual authentication is successful. Although a process for mutual authentication is not specifically limited, the process may be completed according to one command or may be achieved through a plurality of processings.

Figure 3:
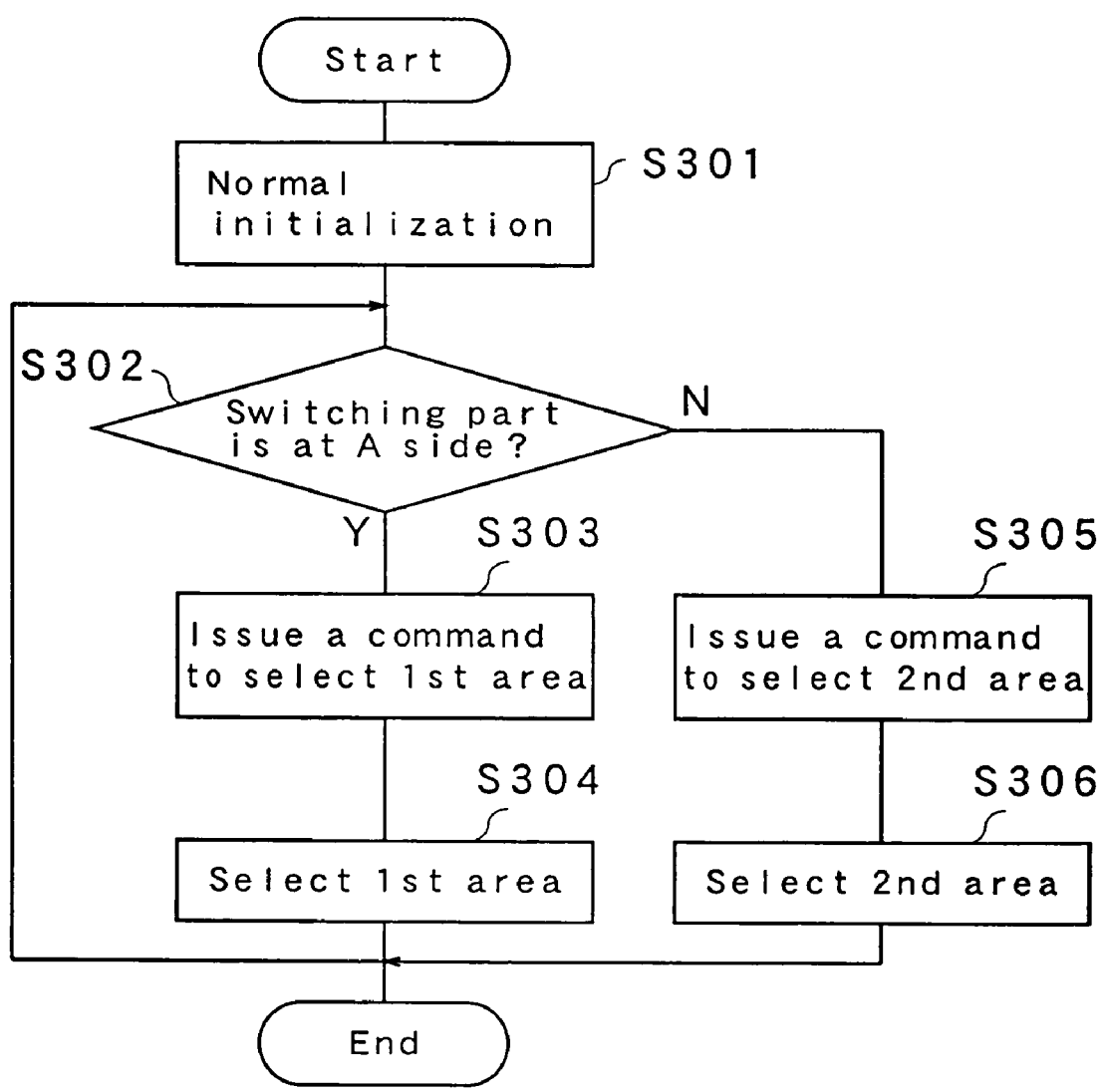
FIG. 3 is a flow chart showing basic operations of the semiconductor memory card and access device in accordance with embodiment 1 of the present invention.

FIG. 3 is a flow chart showing basic processing of the access method in accordance with embodiment 1 of the present invention. First, when the adapter 102 and semiconductor memory card 101 are initialized (S301), the power is turned on or a clock for data transfer with the outside is entered to the semiconductor memory card 101. Subsequently, the determination part 109 detects the state of the switching part 110 and, based on the detected state, determines which of the areas should be selected (S302). When the switching part 110 is set at the side of A, the card controller 108 issues a switching command to select the first area 105 in the semiconductor memory card 101 (S303). The area selection part 107 that receives the switching command selects the first area 105 and switches the subsequent commands to be applied to the first area 105 (S304).

When the switching part 110 is set at the side of B as shown in FIG. 2, the card controller 108 issues a switching command to select the second area 106 in the semiconductor memory card 101(S305). The area selection part 107 that accepts the switching command selects the second area 106 and switches the subsequent commands to be applied to the second area 106 (S306). By switching either of the areas at initialization in this manner, different file systems can be held in the semiconductor memory card.

In embodiment 1 of the present invention, the first area 105 is selected when the area switching part 110 is set at the side of A and the second area 106 is selected when the area switching part 110 is set at the side of B. The area switching part 110 may take any form as long as it can hold the two states and determine which of the areas should be selected.

Although the semiconductor memory card is described as a recording medium in embodiment 1, a combined recording medium that achieves functions of both the semiconductor memory card and IC card may be applied. In this case, the first area carries out a memory card function and the second area caries out an IC card function. In this case, the area selection part serves as a selector for switching between the two functions. The adapter is an access device for accessing this combined recording medium and for, according to a command issued from the adapter, switching a function between the two functions. This also applies to following embodiments.

Although one adapter as an access device is used and the adapter is provided with the area switching part in embodiment 1, a plurality of adapters may be cascaded. In the case where a plurality of adapters are coupled, when the switching parts have different instructions, it is possible to designate which switching part or adapter takes precedence over the remaining switching parts or adapters. Furthermore, in the case where a plurality of adapters is coupled, when the switching parts have different instructions, a priority may be given to an instruction of the adapter closest to the semiconductor memory card or the host.

Embodiment 2

Figure 4:
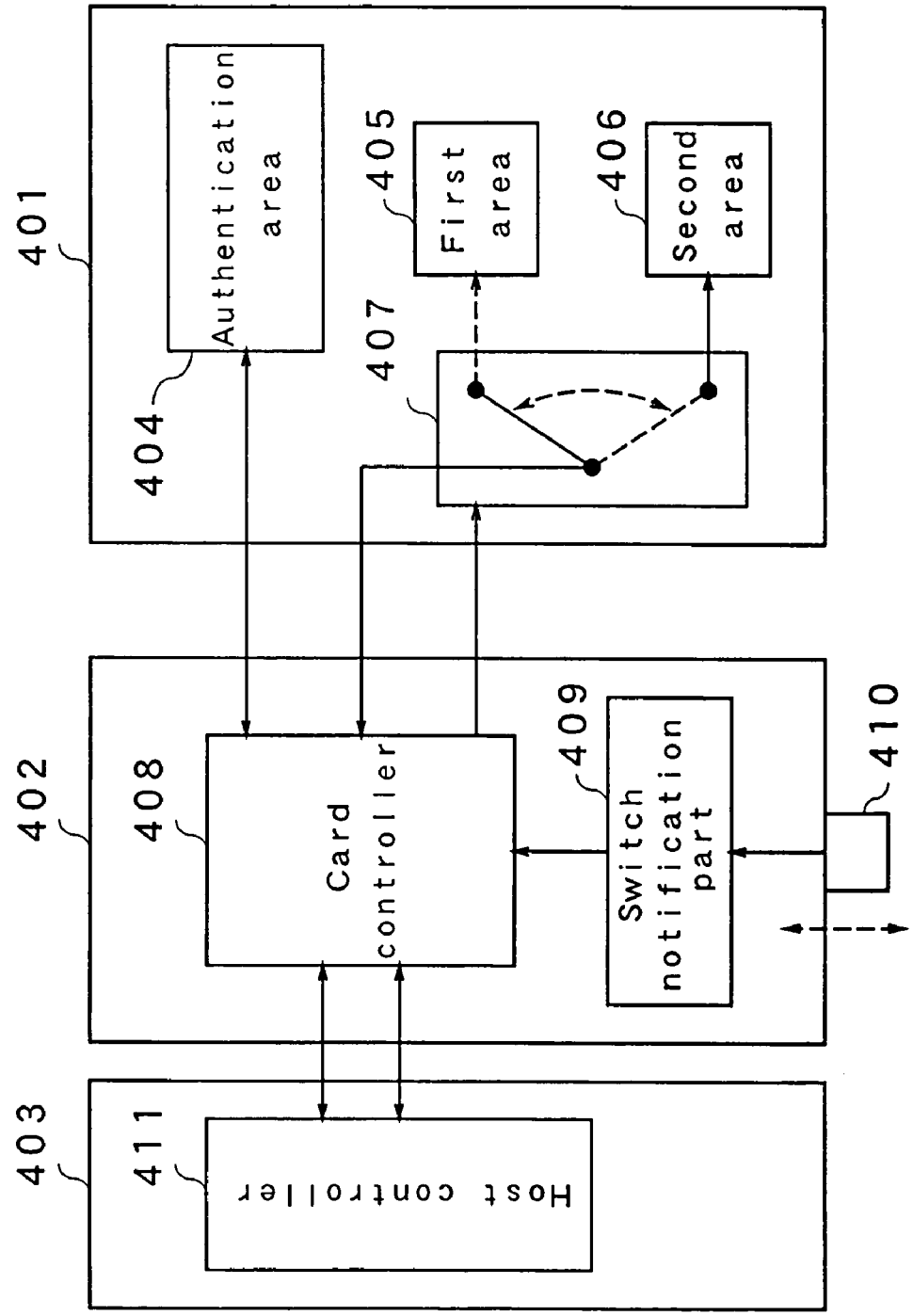
FIG. 4 is a block diagram showing a configuration of a semiconductor memory card and access device in accordance with embodiment 2 of the present invention.

FIG. 4 is a block diagram showing a configuration of a semiconductor memory card and an access device in accordance with embodiment 2 of the present invention. In FIG. 4, a semiconductor memory card 401 is a recording medium in the present embodiment. The semiconductor memory card 401 is configured to include an authentication area 404, first and second areas 405 and 406 and area selection part 407. The authentication area 404 is an area in which the sensitive information such as the copyright information and personal information is stored, for example, which is used for storing the encryption key for encrypting the electronic data to be protected for the copyright and the encryption key further encrypted using the specific numerical value as a key. The first area 405 is an area managed by a specific file system and the second area 406 is an area managed by a file system that is different from the file system managing the first area 405. The area selection part 407 switches the area to be used between the first area 405 and the second area 406 according to an external instruction.

A host 403 is an information processing device that uses the semiconductor memory card 401. The host 403 has a host controller 411. Description of the other components is omitted.

An adapter 402 in the present embodiment is a recording medium access device for connecting the host 403 to the semiconductor memory card 401. The adapter 402 is configured including a card controller 408, a switch notification part 409 and an area switching part 410. Based on notification from the switch notification part 409, the card controller 408 switches between the areas in the semiconductor memory card 401 and relays a signal between the host 403 and semiconductor memory card 401. The switch notification part 409 detects that the area switching part 410 is pressed and informs the card controller 408 of necessity to switch area in the semiconductor memory card 401. The area switching part 410 switches between the areas used in the semiconductor memory card 401 and is configured with a button switch for merely detecting, at being pressed, that the area switching part 410 is pressed.

When an access is made to the authentication area 404 in the semiconductor memory card 401, mutual authentication between the host 403 or adapter 402 and the semiconductor memory card 401 is carried out. The access can be made only when the mutual authentication is successful. Although a process for the mutual authentication is not specifically limited, the mutual authentication may be completed according to one command or may be achieved through a plurality of processings.

Figure 5:
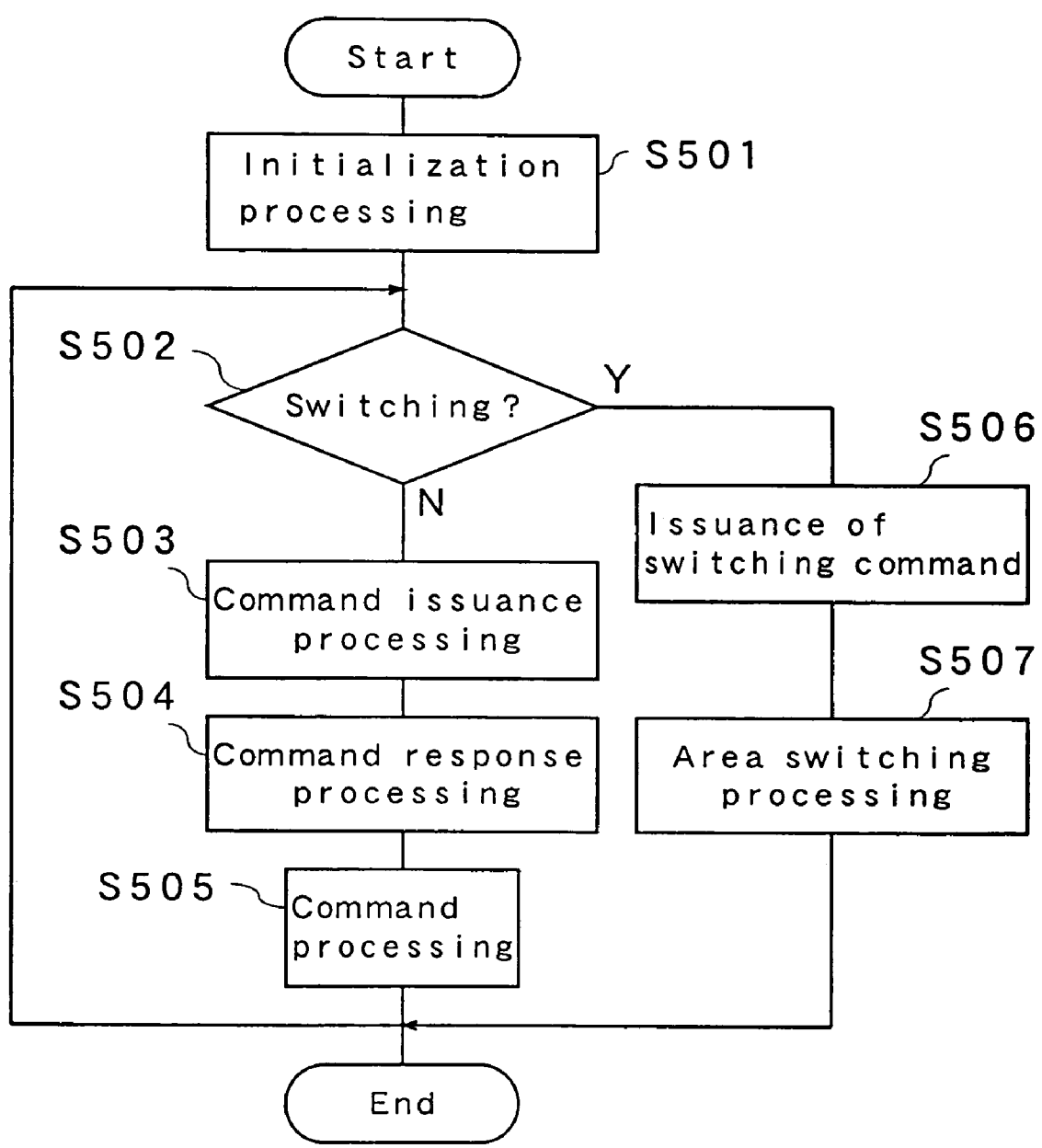
FIG. 5 is a flow chart showing basic operations of the semiconductor memory card and access device in accordance with embodiment 2 of the present invention.

FIG. 5 is a flow chart showing a flow of basic processing of the access method in accordance with embodiment 2 of the present invention. First, when normal initialization is carried out (S501), the power is turned on and a clock for data transfer with the outside is entered to the semiconductor memory card 401. The semiconductor memory card 401 selects a specific area, for example, the first area 405 as a default selected area at initialization. When the initialization finishes, the card controller 408 detects whether or not the switching part 410 issues a switching instruction (S502) and executes normal command processing if no switching instruction is issued. First, the host 403 issues a command, for example, a read command to the semiconductor memory card 401 via the host controller 411 (S503). Subsequently, the command issued from the host controller 411 is transmitted to the semiconductor memory card 401 via the card controller 408 in the adapter 402. The semiconductor memory card 401 performs required response processing depending on the received read command and informs the fact to the host 403 via the adapter 402 (S504). Next, data is read from the first area 405 according to the read command from the host 403 and the result is transferred to the host 403 via the adapter 402 (S505). The semiconductor memory card 401 makes a preparation for accepting next command and waits for the command. When an access to the semiconductor memory card 401 is required, the host controller 411 issues a command that can be interpreted by the semiconductor memory card 401. The processing from S502 to S505 is repeatedly performed in this manner.

Here, when the user presses the area switching part 410, a switch notification part 609 determines that an input of area switching is made and informs the card controller 408 of necessity to switch the area in the semiconductor memory card 401. The card controller 408 issues an area switching command to the semiconductor memory card 401 at a step S506. According to the area switching command issued from the card controller 408, the area selection part 407 in the semiconductor memory card 401 selects an area that is different from the currently selected area. As described above, in the present embodiment, when the area switching part 410 is pressed at an arbitrary timing, the area selection part 407 dynamically switches an area between the first area 405 and second area 406, that is, switches an area to the area to be accessed by the host 403. Here, the adapter as the recording medium access device issues the switching command when a signal is sent from the area switching part and performs the processing of the S502 and S506 at the adapter 403.

In embodiment 2 of the present invention, the area switching part 410 is configured with a press button switch. However, the area switching part may be configured with any configuration as long as it can detect a change in the state including pressing, separating and moving. Furthermore, the area switching part 410 may be provided at the adapter or the host.

Although the switching command is issued as needed, issuance of the switching command may be prevented during, for example, processing of mutual authentication or a particular process.

Furthermore, when the switching occurs during the mutual authentication or similar processing thereof, the switching command may be automatically issued after the mutual authentication or similar processing finishes.

Embodiment 3

Figure 6A:
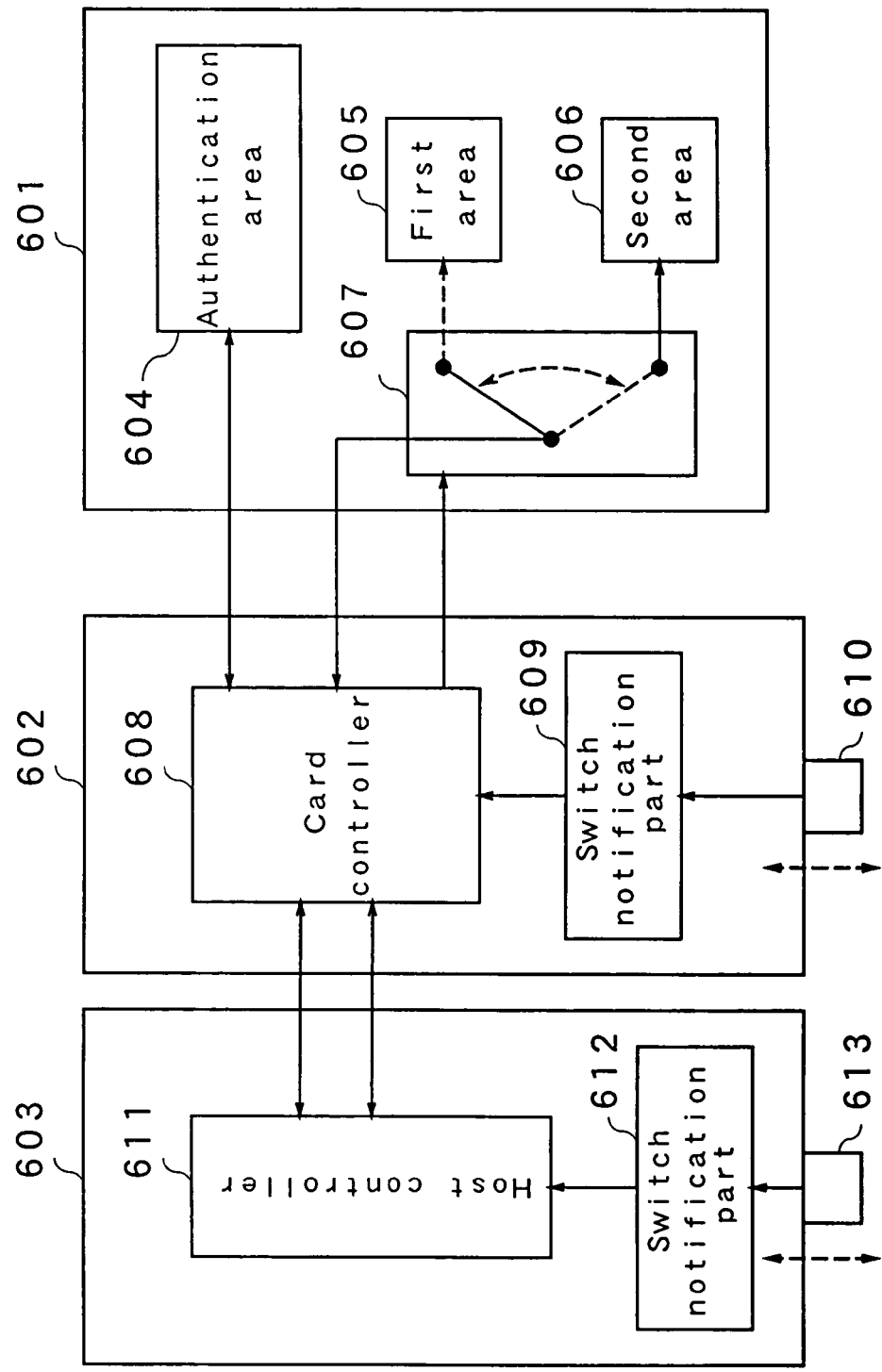
FIG. 6A is a block diagram showing a configuration of a semiconductor memory card and access device in accordance with embodiment 3 of the present invention.

FIG. 6A is a block diagram showing a configuration of a semiconductor memory card and an access device in accordance with embodiment 3 of the present invention. Embodiment 3 of the present invention is characterized by that the area switching part as a feature of embodiment 2 is also provided at the host side. A semiconductor memory card 601 is a recording medium in the present embodiment. The semiconductor memory card 601 is configured including an authentication area 604, a first area 605, a second area 606 and an area selection part 607. The authentication area 604 is an area in which the sensitive information such as the copyright information and personal information is stored, and, for example, which is used for storing the encryption key for encrypting the electronic data to be protected for the copyright and the encrypting key further encrypted using the specific numerical value as a key. The first area 605 is an area managed by a specific file system and the second area 606 is an area managed by a file system that is different from the file system managing the first area 605. The area selection part 607 switches the area to be used between the first area 605 and the second area 606 according to an external instruction.

An adapter 602 in the present embodiment is a recording medium access device for connecting the host 603 to the semiconductor memory card 601. The adapter 602 is configured including a card controller 608, a switch notification part 609 and an area switching part 610. The area switching part 610 switches between the areas used in the semiconductor memory card 601. Based on notification from the switch notification part 609, the card controller 608 switches the areas in the semiconductor memory card 601 and relays signals of the host 603 and semiconductor memory card 601. The switch notification part 609 detects that the area switching part 610 is pressed and informs the card controller 608 of necessity to switch the area in the semiconductor memory card 601. The area switching part 610 is configured with a button switch for merely detecting, at being passed, that the area switching part is pressed.

The host 603 is an information processing device using the semiconductor memory card and is also a recording medium access device in the present embodiment. The host 603 is configured to include a host controller 611, a switch notification part 612 and an area switching part 613. Based on notification from the switch notification part 612, the host controller 611 issues a command to switch area in the semiconductor memory card 601, issues a command for access when an access to the semiconductor memory card 601 is required and receives a response from the semiconductor memory card 601. The host controller 611 carries out a function as the card controller 608. The switch notification part 612 detects that the area switching part 613 is pressed and informs the host controller 611 of necessity to switch the area in the semiconductor memory card 601. The area switching part 613 switches between the areas used in the semiconductor memory card 601 and is configured with the button switch for merely detecting, at being pressed, that the area switching part is pressed.

Figure 7:
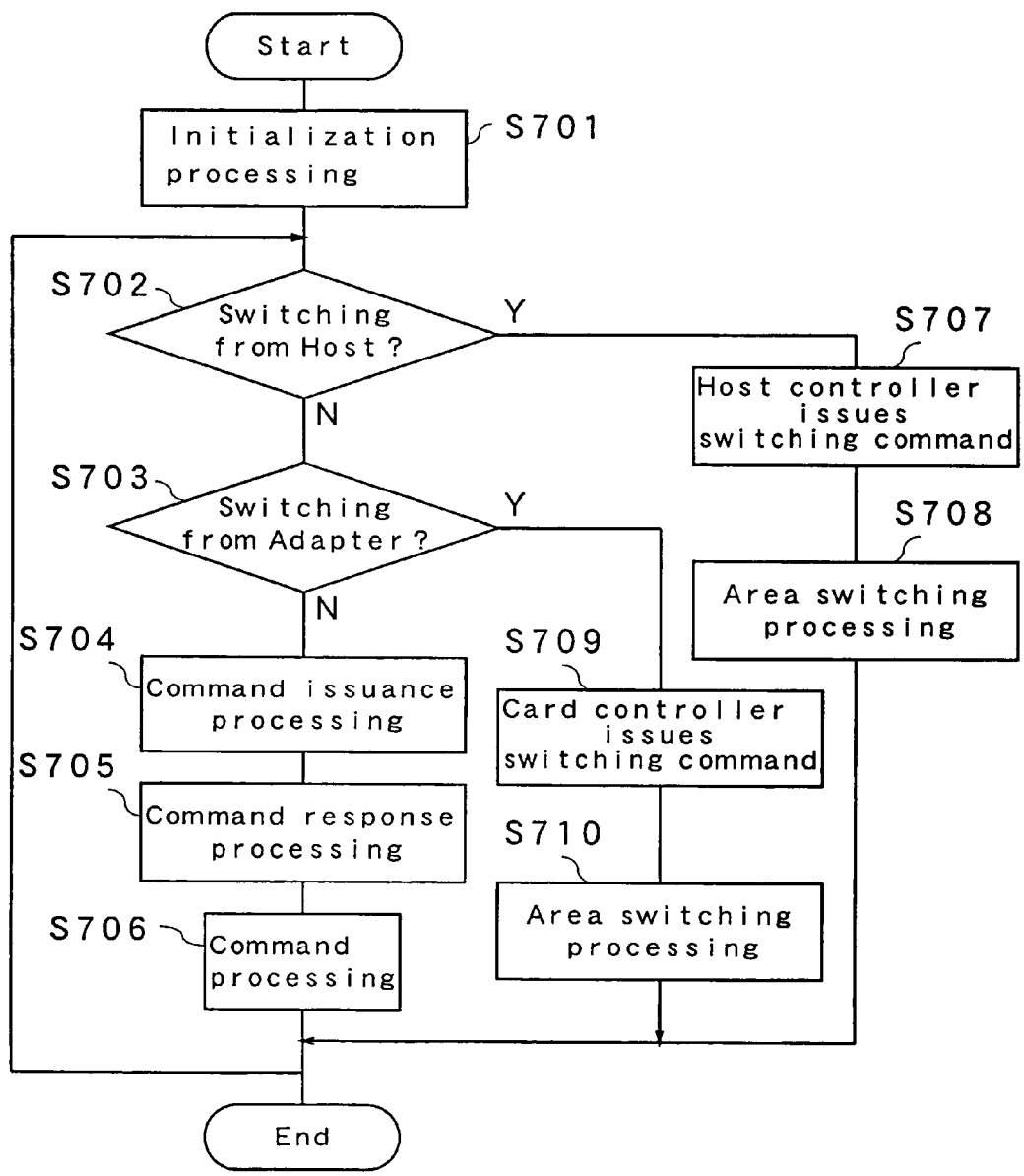
FIG. 7 is a flow chart showing basic operations of the semiconductor memory card and access device in accordance with embodiment 3 of the present invention.

Operations in, thus configured, embodiment 3 of the present invention will be described. FIG. 7 is a flow chart showing a flow of basic processing in accordance with embodiment 3 of the present invention. First, when normal initialization is carried out (S701), the power is turned on and a clock for data transfer with the outside is entered to the semiconductor memory card 601. The semiconductor memory card 601 selects a specific area, for example, the first area 605 as a default selected area at initialization. When the initialization finishes, the host controller 611 of the host 603 detects whether or not the switch notification part 612 issues a switching instruction (S702). If no switching instruction is issued, the card controller 608 detects whether or not the switching instruction is informed from the switch notification part 609 (S703) and executes normal command processing if no switching instruction is informed. In the normal command processing, first, the host 603 issues a command, for example, a read command to the semiconductor memory card 601 via the host controller 611 (S704). The command issued from the host controller 611 is transmitted to the semiconductor memory card 601 via the card controller 608 in the adapter 602. The semiconductor memory card 601 performs necessary response processing depending on the received read command and informs the fact to the host 603 via the adapter 602 (S705). Next, data is read from the first area 605 according to the read command from the host 603 and the result is transferred to the host 603 via the adapter 602 (S706). The semiconductor memory card 601 makes a preparation for accepting next command and waits for the command. When an access to the semiconductor memory card 601 is required, the host controller 611 issues a command that can be interpreted by the semiconductor memory card 601. The processings from S702 to S706 is repeatedly performed in this manner.

Here, when the user presses the area switching part 613 attached to the host 603, the switch notification part 612 transmits this signal to the host controller 611. The host controller 611 determines that the switching instruction is issued at the S702 and issues an area switching command to the semiconductor memory card 601 at a S707. According to the area switching command issued from the host controller 611 in the host 603, the area selection part 607 in the semiconductor memory card 601 selects an area that is different from the currently selected area. As described above, in the present embodiment, every time the area switching part 613 is pressed at an arbitrary timing, the area accessed by the host 603 is alternatively switched between the first area 605 and second area 606.

Similarly, when the user presses the area switching part 610 attached to the adapter 602, the switch notification part 610 transmits the fact that area switching is required to the card controller 608. The card controller 608 determines that the switching instruction is issued at the S703 and issues an area switching command to the semiconductor memory card 601. According to the area switching command issued from the card controller 608 in the adapter 602, the area selection part 607 selects an area that is different from the currently selected area. As described above, every time the area switching part 610 or 613 is pressed at an arbitrary timing, the area selection part 607 can switch an area accessed by the host 603 by switching areas between the first area 605 and second area 606. The area switching part 613 attached to the host 603 and the area switching part 610 attached to the adapter 602 are asynchronously operated with each other. That is, when the area switching part 610 is pressed during use of the first area 605, the area is switched to the second area 606 and subsequently, when the area switching part 613 is pressed, the accessible area is switched to the first area 605 again.

Figure 6B:
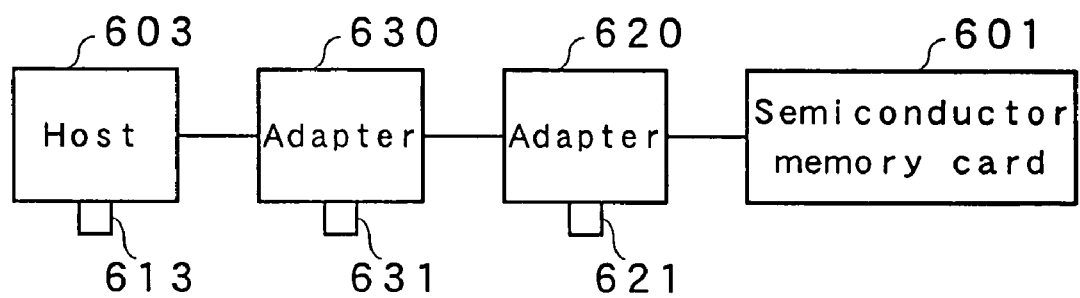
FIG. 6B is a block diagram showing a configuration of a semiconductor memory card and access device in accordance with a modification example of the present invention.

Although one adapter is provided in the access device in accordance with embodiment 3 of the present invention, since the switching parts can asynchronously operate with each other, a plurality of adapters each having an area switching part may be coupled to each other. For example, as shown in FIG. 6B, given that the semiconductor memory card is a mini SD card, an adapter 620 to which the mini SD card is inserted and which has the same shape of a normal SD card may be coupled to an adapter 630 and the like for connecting a normal SD card to a USB terminal of a personal computer or the like. In this case, the adapters 620 and 630 have area switching parts 621 and 631, respectively. In this case, the area can be switched, according to any of setting of the plurality of area switching parts 613, 623 and 631 and when any of these area switching parts is operated.

A plurality of area switching parts may be provided at each of the host and adapter. The area switching part is not limited to the button switch. Although the area switching parts are used for area switching, the area switching parts may be configured so as to select the area as well as switch additional functions. Furthermore, an adapter having no area switching part may be coupled. The number of areas that can be selected by the area switching part is not limited to two.

A plurality of area switching parts may be provided in the semiconductor memory card. The area selection part in the semiconductor memory card may have additional functions and may select the additional functions when switching the areas.

Embodiment 4

Figure 8:
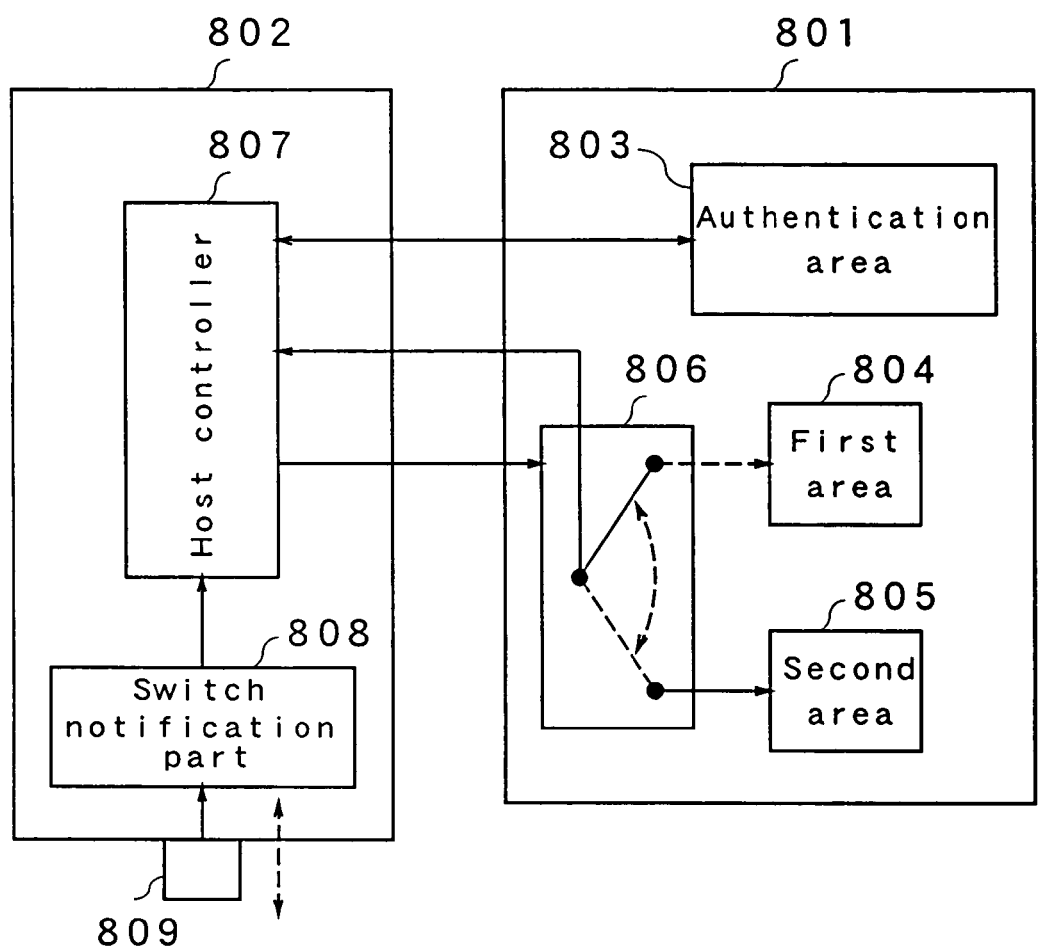
FIG. 8 is a block diagram showing a configuration of a semiconductor memory card and access device in accordance with embodiment 4 of the present invention.

FIG. 8 is a block diagram showing a configuration of a semiconductor memory card and an access device in accordance with embodiment 4 of the present invention. Although the adapter is interposed between the host and semiconductor memory card in embodiment 3, in embodiment 4, the host itself has an attachment part connecting to the semiconductor memory card and serves as a recording medium access device. A semiconductor memory card 801 is a recording medium in this embodiment. The semiconductor memory card 801 is configured to include an authentication area 803, a first area 804, a second area 805 and an area selection part 806. The authentication area 803 is an area in which the sensitive information such as the copyright information and personal information is stored, and, for example, which is used for storing the encryption key for encrypting the electronic data to be protected for the copyright and the encryption key further encrypted using the specific numerical value as a key. The first area 804 is an area managed by a specific file system and the second area 805 is an area managed by a file system that is different from the file system managing the first area 804. The area selection part 806 switches the area to be used between the first area 804 and the second area 805 according to an external instruction.

The host 802 is an access device for accessing the semiconductor memory card 801. The host 802 is configured to include a host controller 807, a switch notification part 808 and an area switching part 809. The area switching part 809 switches between the areas used in the semiconductor memory card 801 and is configured with a button switch for merely detecting, at being pressed, that the area switching part is pressed. The switch notification part 808 detects that the area switching part 809 is pressed and informs the host controller 807 of necessity to switch the areas in the semiconductor memory card 801. Based on notification from the switch notification part 808, the host controller 807 issues a command to switch between the areas in the semiconductor memory card 801, issues a command for access when an access to the semiconductor memory card 801 is required and receives a response from the semiconductor memory card 801. Although a process for the mutual authentication is not specifically limited, the mutual authentication may be completed according to one command or may be achieved through a plurality of processings.

Figure 9:
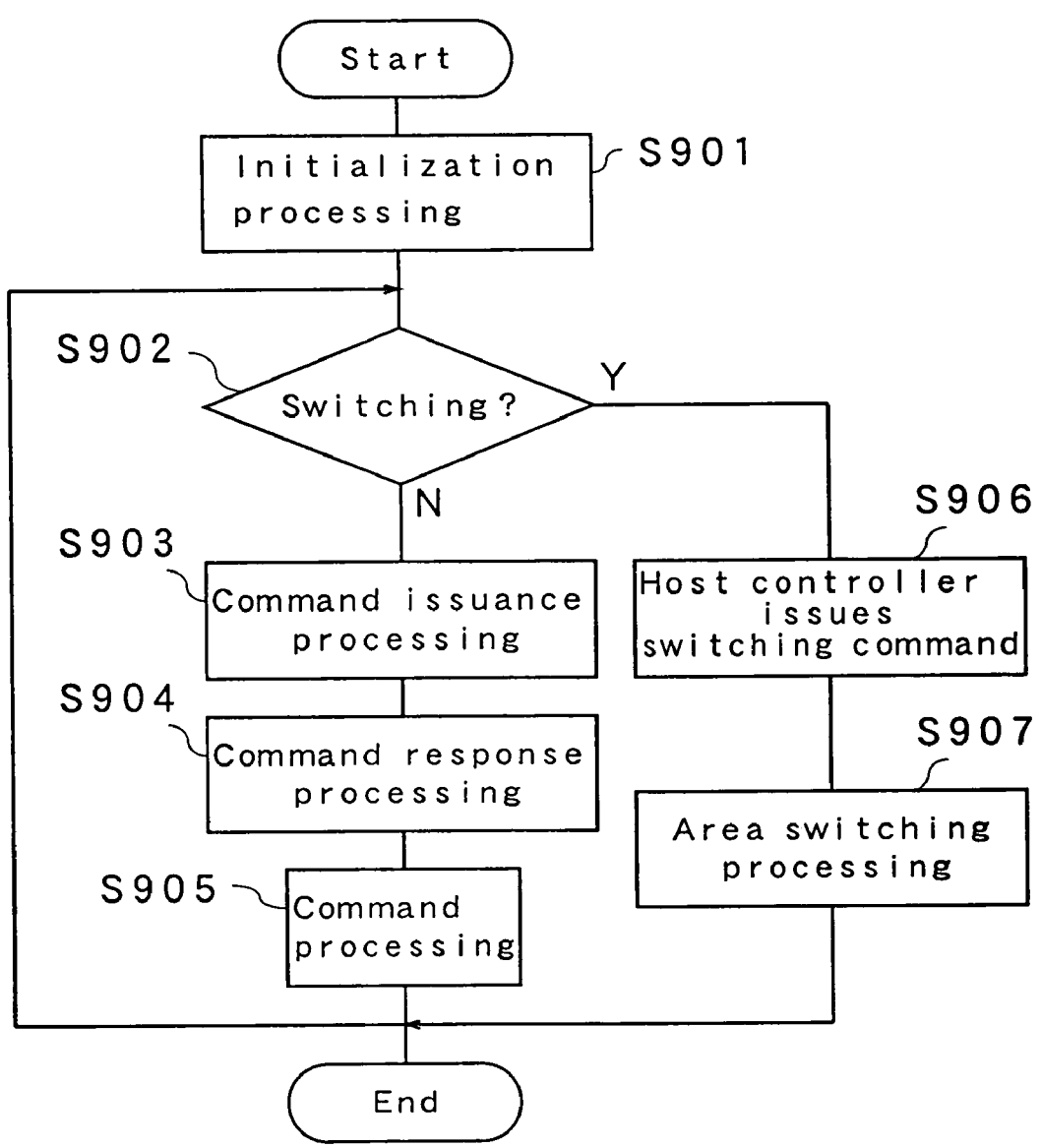
FIG. 9 is a flow chart showing basic operations of the semiconductor memory card and access device in accordance with embodiment 4 of the present invention.

Operations in thus configured embodiment 4 of the present invention will be described. FIG. 9 is a flow chart showing a flow of basic processing of the access method in accordance with embodiment 4 of the present invention. First, when normal initialization is carried out (S901), the power is turned on and a clock for data transfer with the outside is entered to the semiconductor memory card 801. The semiconductor memory card 801 selects a specific area, for example, the first area 804 as a default selected area at the initialization. When the initialization finishes, the host controller 807 in the host 802 detects whether or not a switching instruction from the switch notification part 809 is informed from switch notification part 808 (S902) and executes normal command processing if no switching instruction is informed. The host controller 807 in the host 802 issues a command, for example, a read command to the semiconductor memory card 801 (S903). The command issued from the host controller 807 is transmitted to the semiconductor memory card 801. The semiconductor memory card 801 perform necessary response processing depending on the received read command and informs the fact to the host 802 (S904). Next, data is read from the first area 804 according to the read command from the host 802 and the result is transferred to the host 802 (S905). The semiconductor memory card 801 makes a preparation for accepting the next command and waits for the command. When an access to the semiconductor memory card 801 is required, the host controller 807 issues a command that can be interpreted by the semiconductor memory card 801. The processings from S902 to S905 is repeatedly performed in this manner.

Here, when the user presses the area switching part 809 attached to the host 802, the switch notification part 808 informs the host controller of necessity to switch area. The host controller 807 determines that the switching instruction is issued at the S902 and issues an area switching command to the semiconductor memory card 801. According to the area switching command issued from the host controller 807, the area selection part 806 selects an area that is different from the currently selected area. As described above, every time the area switching part 809 is pressed at arbitrary timing, the area accessed by the host 802 can be switched by switching between the first area 804 and second area 805.

A plurality of area switching parts may be provided in the access device in accordance with embodiment 4. The area switching part is not limited to the button switch. Although the area switching part is used for area switching, the area switching part may be used as an input part for switching between the areas and additional functions at the same time. The additional functions are thought as the following function: in a large-capacity semiconductor memory card, depending on sources for signals to be recorded, the first area is used when only small capacity is required as in recording document information and the second area is used when the large capacity is required as in recording audio-video signals, and accordingly, an operating clock is changed. Furthermore, when the semiconductor memory card is used as a card having a communication function in addition to the data recording function, the function is switched. In this case, the area selection part in the semiconductor memory card may have additional functions and may select the additional functions when switching the areas.

An adapter having no area switching part may be connected between the host and semiconductor memory card.

The number of areas that can be selected by the area switching part is not limited to two. A plurality of area switching parts may be provided in the semiconductor memory card.

Although one authentication area is provided in the semiconductor memory card, a pair of the first area and a first authentication area corresponding to the first area and a pair of the second area and a second authentication area corresponding to the second area may be switched at the same time.

Although the switching command is issued as needed, the issuance of the switching command may be prevented, for example, during processing of the mutual authentication or a particular process.

Furthermore, when the switching occurs during the mutual authentication or similar processing, the switching command may be automatically issued after the mutual authentication or similar processing finishes.

Embodiment 5

Figure 10:
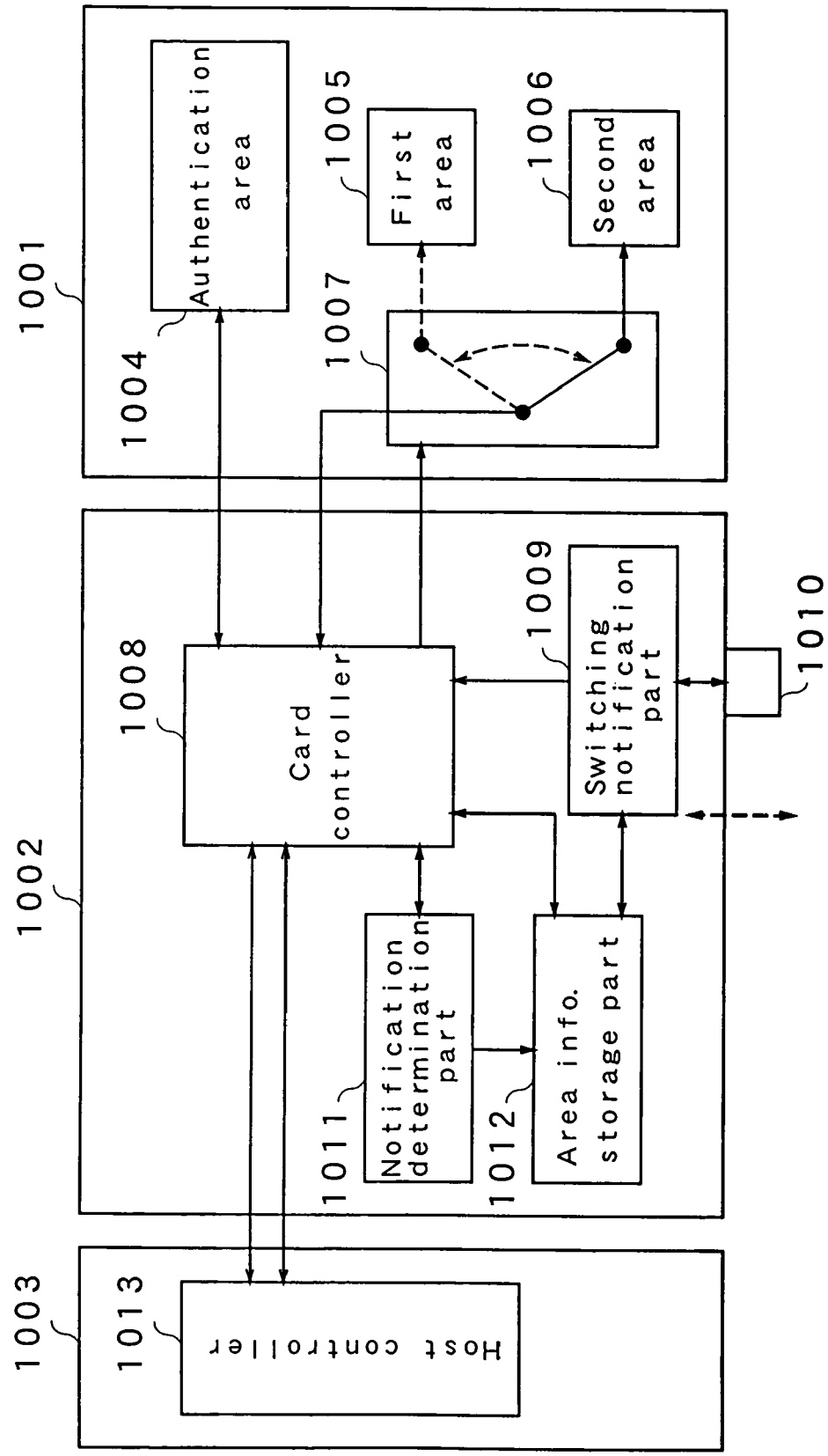
FIG. 10 is a block diagram showing a configuration of a semiconductor memory card and access device in accordance with embodiment 5 of the present invention.

FIG. 10 is a block diagram showing a configuration of a semiconductor memory card and an access device in accordance with embodiment 5 of the present invention. In FIG. 10, a semiconductor memory card 1001 is a recording medium in this embodiment. The semiconductor memory card 1001 is configured including an authentication area 1004, a first area 1005, a second area 1006 and an area selection part 1007. The authentication area 1004 is an area in which the sensitive information such as the copyright information and personal information is stored, for example, which is used for storing the encryption key for encrypting the electronic data to be protected for copyright and the encryption key further encrypted using the specific numerical value as a key. The first area 1005 is an area managed by a specific file system and the second area 1006 is an area managed by a file system that is different from the file system managing the first area 1005. The area selection part 1009 switches between the first area 1005 and second area 1006 according to an external instruction.

A host 1003 is an information processing device that uses the semiconductor memory card 1001. The host 1003 is provided with a host controller 1013. Description of the other components is omitted.

An adapter 1002 in the present embodiment is a recording medium access device for connecting the host 1003 to the semiconductor memory card 1001. The adapter 1002 is configured to include a card controller 1008, a switch notification part 1009, an area switching part 1010, a notification determination part 1011 and a area information storage part 1012. Based on notification from the switch notification part 1009, the card controller 1008 switches between the areas in the semiconductor memory card 1001 and relays signals of the host 1003 and semiconductor memory card 1001. The switch notification part 1009 detects that the area switching part 1010 is pressed and informs the card controller 1008 of necessity to switch the area in the semiconductor memory card 1001. The area switching part 1010 switches between the areas used in the semiconductor memory card 1001 and is configured with a button switch for merely detecting, at being pressed, that the area switching part is pressed. The area information storage part 1012 stores information on the used area, for example, the file systems and capacity of the first area 1005 and second area 1006. When switching between areas in the semiconductor memory card is actually performed as a result that the area switching command is sent to the semiconductor memory card by pressing the area switching part 1010, the notification determination part 1011 determines whether or not the fact that the area has been switched should be informed to the host.

Figure 11:
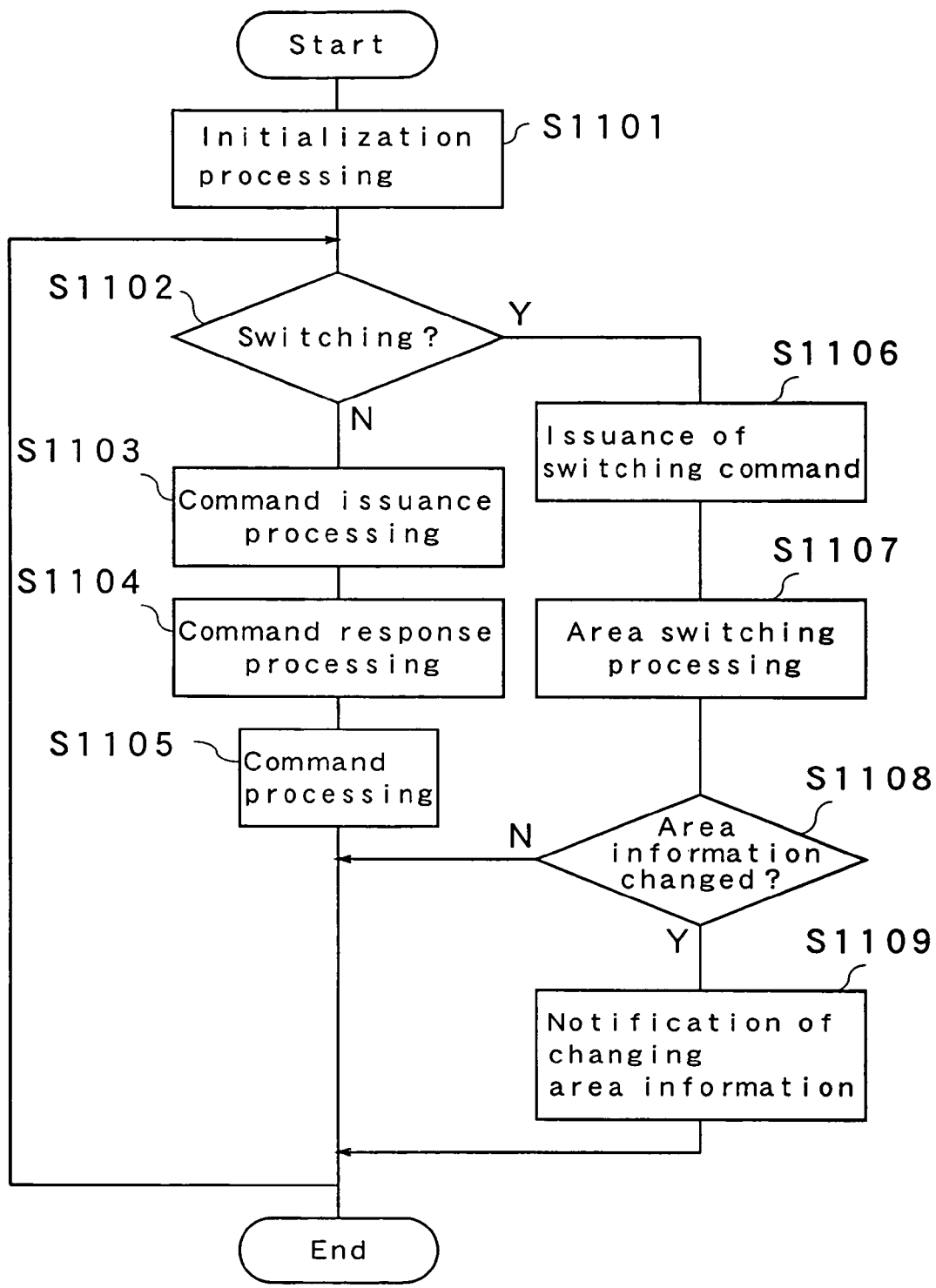
FIG. 11 is a flow chart showing basic operations of the semiconductor memory card and access device in accordance with embodiment 5 of the present invention.

FIG. 11 is a flow chart showing a flow of basic operations of the semiconductor memory card and access device in accordance with embodiment 5 of the present invention. First, when normal initialization is carried out (S1101), the power is turned on and a clock for data transfer with the outside is entered to the semiconductor memory card 1001. The semiconductor memory card 1001 selects a specific area, for example, the first area 1005 as a default selected area at the initialization. Here, the initialization processing at the S1101 includes processing of holding information on the area selected at the initialization in the area information storage part 1012. When initialization finishes, the card controller 1008 detects whether or not the switch part 1010 issues a switching instruction (S1102) and executes normal command processing if no switching instruction is issued. First, the host 1003 issues a command, for example, a read command to the semiconductor memory card 1001 via the host controller 1013 (S1103). Subsequently, the command issued from the host controller 1013 is transmitted to the semiconductor memory card 1001 via the card controller 1008 in the adapter 1002. The semiconductor memory card 1001 performs necessary response processing depending on the received read command and informs the fact to the host 1003 via the adapter 1002 (S1104). Next, data is read from the first area 1005 according to the read command from the host 1003 and the result is transferred to the host 1003 via the adapter 1002 (S1105). The semiconductor memory card 1001 makes a preparation for accepting the next command and waits for the command. When an access to the semiconductor memory card 1001 is required, the host controller 1013 issues a command that can be interpreted by the semiconductor memory card 1001. The processings from the S1102 to S1105 is repeatedly performed in this manner.

Assuming that the area switching part 1010 has issued the area switching instruction. In this case, the switch notification part 1009 informs the card controller 1008 of necessity to switch area and the area switching command is transmitted to the semiconductor memory card 1001 at a S1106. Thus, the area selection part 1000 switches between the areas on the side of the semiconductor memory card and completion of the switching processing is informed to the card controller 1008. When the switching is normally performed, information in the area information storage part 1012 is rewritten. For this reason, at a step S1108, it is determined whether or not the area information is changed. Then, when the area information is changed, the fact that the area information has been changed is informed to the host 1003 at a S1109. When the area information is not changed, the operation returns to the S1102 without performing the processing at the S1109. The area switching processing (S1107) includes processing of storing information on the area before and after switching in the area information storage part 1012.

The notification determination part 1011 may judge necessity of notification through setting on the side of the host 1003.

As described above, in the semiconductor memory card and access device in accordance with embodiment 5 of the present invention, the fact that the area in the semiconductor memory card 1001 is switched is informed to the host 1003. Therefore, the host 1003 can recognize that the area has been switched and corresponding processing can be readily performed. For this reason, it is possible to provide the very convenient access device.

Embodiment 6

Figure 12:
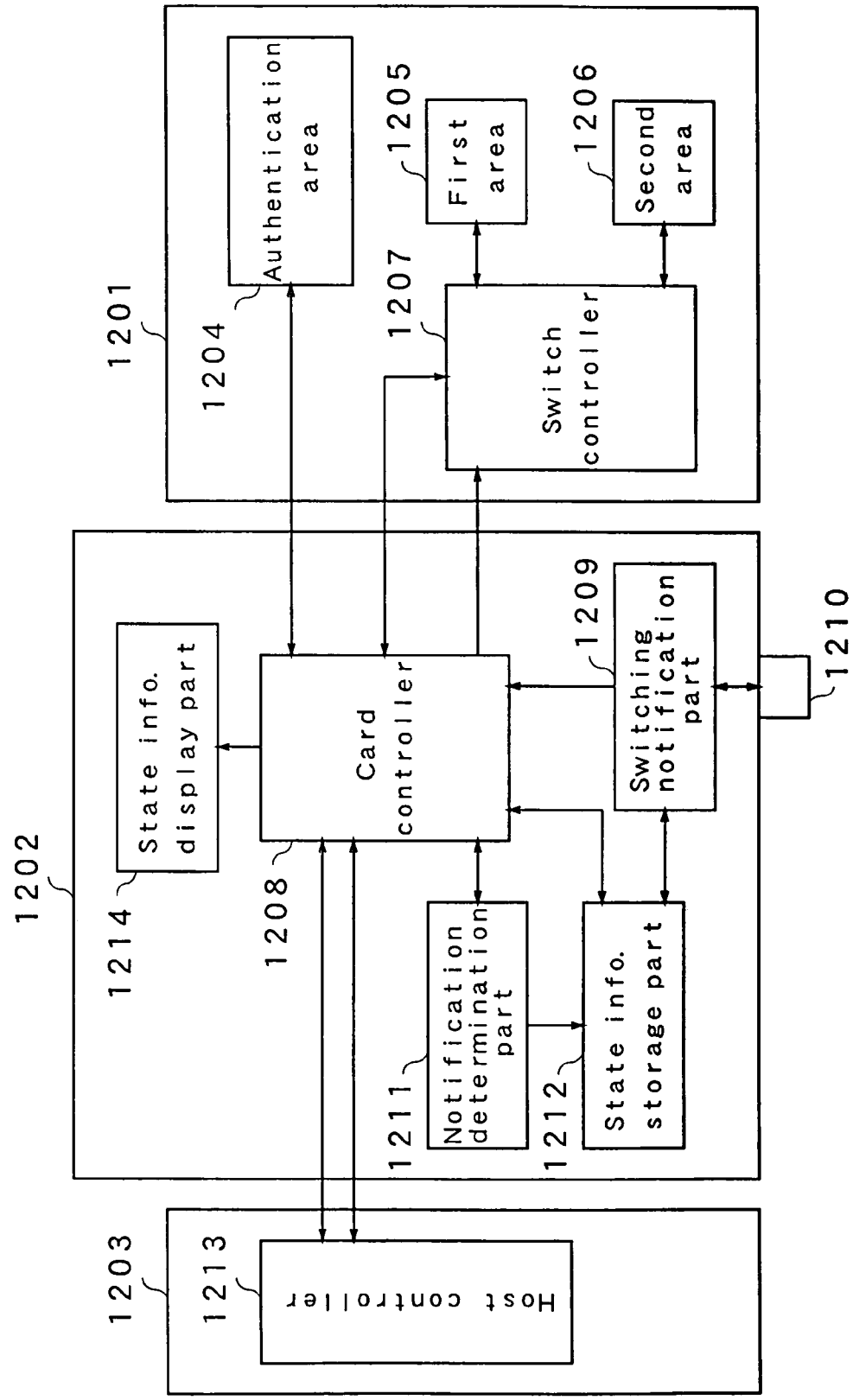
FIG. 12 is a block diagram showing a configuration of a semiconductor memory card and access device in accordance with embodiment 6 of the present invention.

FIG. 12 is a configuration view of a semiconductor memory card and an access device in accordance with embodiment 6 of the present invention. A semiconductor memory card 1201 is a recording medium in the present embodiment. The semiconductor memory card 1201 is configured including an authentication area 1204, a first area 1205, a second area 1206 and a switch controller 1207. The authentication area 1204 is an area in which the sensitive information such as the copyright information and personal information is stored, the first area 1205 is an area managed by a specific file system and the second area 1206 is an area managed by a file system that is different from the file system managing the first area 1205. According to an external instruction, the switch controller 1207 switches between the first area 1205 and second area 1206 and switches between access methods to each area. A host 1203 uses the semiconductor memory card 1201 and is provided with a host controller 1213.

Figure 13:
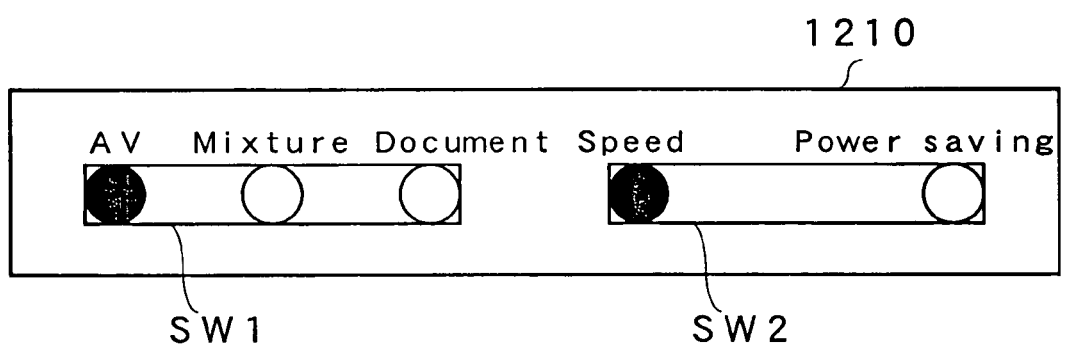
FIG. 13 is a schematic view showing a configuration example of a switching part in the semiconductor memory card and access device in accordance with embodiment 6 of the present invention.

An adapter 1202 in the present embodiment is a recording medium access device for connecting the host 1203 to the semiconductor memory card 1201. The adapter 1202 is configured including a card controller 1208, switch notification part 1209, switching part 1210, notification determination part 1211, state information storage part 1212 and state information display part 1214. Based on notification from the switch notification part 1209, the card controller 1208 switches the area and control method of the semiconductor memory card 1201 and relays a signal of the host 1203 and semiconductor memory card 1201. The switch notification part 1209 detects that the state of the switching part 1210 has been changed and informs the card controller 1208 of necessity to switch the control method of the semiconductor memory card 1201 including switching between the areas in the semiconductor memory card 1201. The switching part 1210 is a switch for switching the type of data recorded in the semiconductor memory card 1201 and access method. For example, as shown in FIG. 13, the switching part 1210 is configured with a three-state button switch SW1 and a two-state button switch SW2. The three-state button switch SW1 is a switch for indicating which is handled data, AV stream data, a document file or their mixture. The two-state button switch SW2 is a switch for instructing whether an access to the semiconductor memory card is made in favor of speed or in favor of power saving. Based on a change in the state of the switching part 1209, the notification determination part 1211 determines whether or not area information or control information is switched and further determines whether or not the fact should be informed to the host 1203. The state information storage part 1212 stores information before and after switching of the area and the control method by the switching part 1209. The state information display part 1214 is a display part for informing state information to user.

Figure 14:
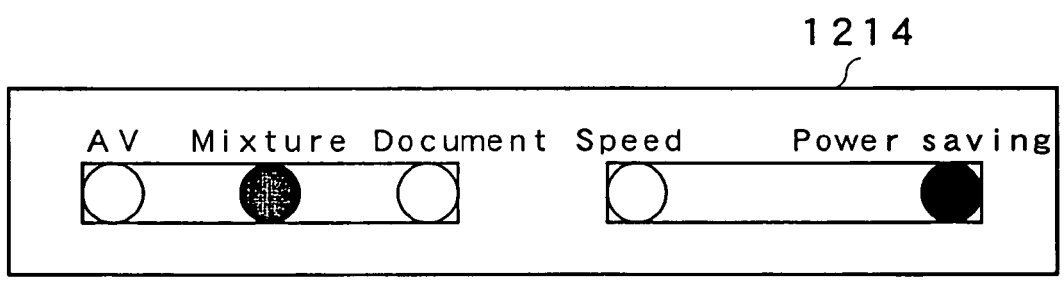
FIG. 14 is a schematic view showing a display example of a state information display part in the semiconductor memory card and access device in accordance with embodiment 6 of the present invention.

FIG. 14 shows a display example of the state information display part 1214. FIG. 14 shows the case where AV stream data and document data are mixed, that is, for example, the first area 1205 and second area 1206 are used while being automatically switched therebetween. Regarding the control method, the figure shows that a control method in favor of power saving is set.

Figure 15:
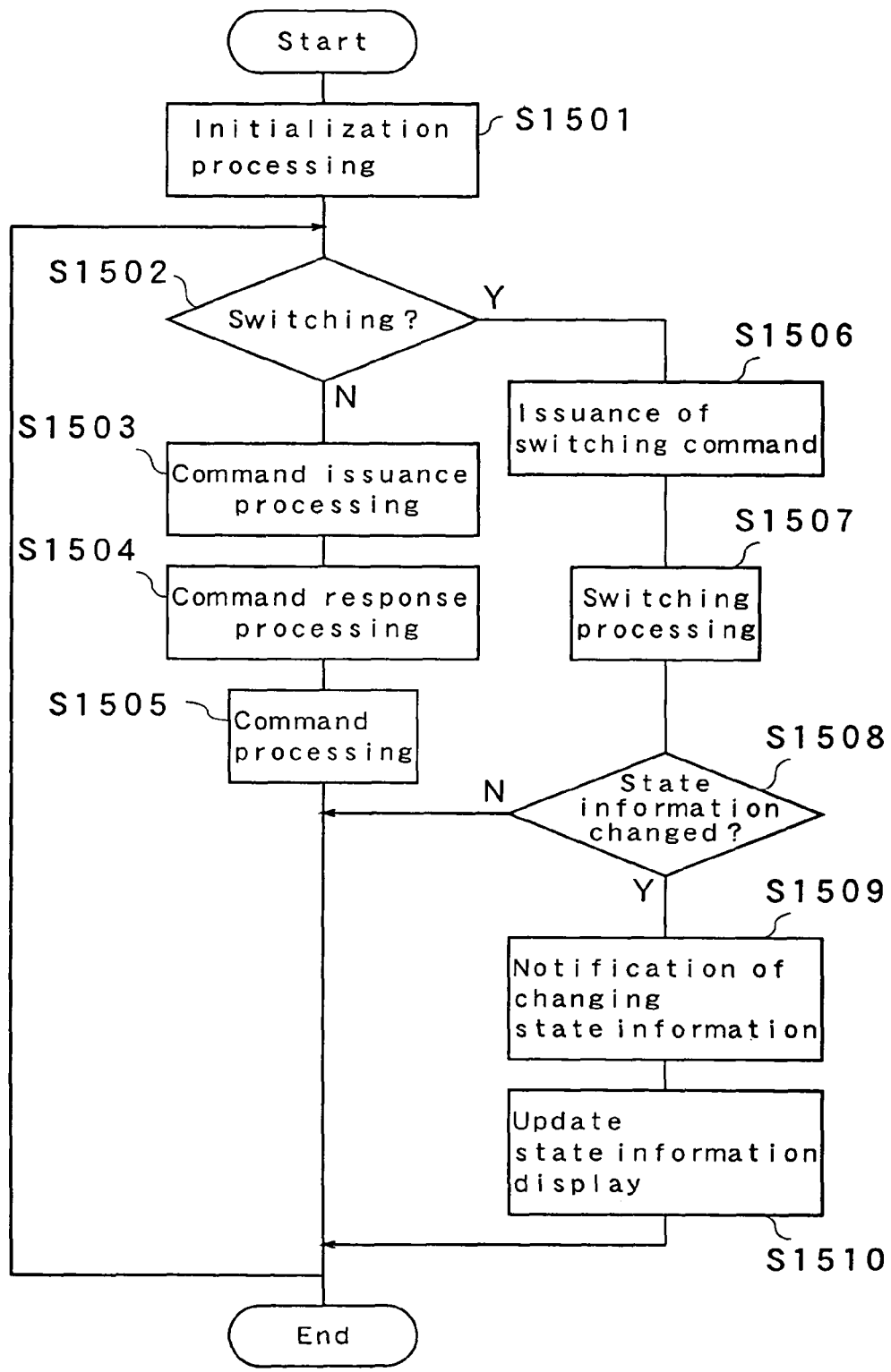
FIG. 15 is a flow chart showing basic operations of the semiconductor memory card and access device in accordance with embodiment 6 of the present invention.

FIG. 15 is a flow chart showing a flow of basic processing in accordance with embodiment 6 of the present invention. First, when normal initialization is carried out (S1501), the power is turned on and a clock for data transfer with the outside is entered to the semiconductor memory card 1201. The semiconductor memory card 1201 selects a specific area, for example, the first area 1205 as a default selected area at initialization. The initialization processing includes initialization of the state information storage part 1212. When the initialization finishes, the card controller 1208 detects whether or not the switch part 1210 issues a switching instruction (S1502). When no switching instruction is issued, the card controller 1208 executes normal command processing. In the normal command processing, the host 1203 issues a command, for example, a read command to the card via the host controller 1213 (S1503). The issued command is transmitted to the semiconductor memory card 1201 via the card controller 1208 in the adapter 1202. The semiconductor memory card 1201 performs necessary response processing depending on the received read command and informs the fact to the host 1203 via the adapter 1202 (S1504). Next, data is read from the first area 1205 according to the read command from the host and the result is transferred to the host 1203 via the adapter 1202 (S1505). The semiconductor memory card 1201 makes a preparation for accepting the next command and waits for the command. When an access to the semiconductor memory card 1201 is required, the host controller 1213 issues a command that can be interpreted by the semiconductor memory card 1201. The processing from the S1502 to S1505 is repeatedly performed in this manner.

Here, when the user operates the switching part 1210 attached to the adapter 1202 and changes the state, the output is sent from the switch notification part 1209 to the card controller 1208. The card controller 1208 determines that the switching instruction has been issued at the S1502 and issues a switching command to the semiconductor memory card 1201. According to the switching command issued from the card controller 1208 in the adapter 1202, the switching controller 1207 in the semiconductor memory card 1201 switches area or the control method used in the semiconductor memory card 1201. In this manner, every time the switching part 1210 is operated, the switch controller 1207 switches an area between the first area 1205 and second area 1206 or control methods. When the switching part 1210 is operated to switch between the areas or the control methods, according to the notification from the switch notification part 1209, the card controller 1208 inquires the notification determination part 1211 whether or not the state information has been changed on the basis of the old state where the information is stored in the state information storage part 1212 and state after switching (S1508). When the state information is changed and the change in the state needs to be informed to the host controller 1213, state information change notification is informed to the host controller 1213 (S1509) and then state information display is updated (S1510).

In embodiment 6 of the present invention, the switching part 1210 only needs to handle the selectable number of states and shape and operation method thereof are not specifically limited.

Although the state information display part 1214 is provided at the adapter 1202, a similar component may exist in the semiconductor memory card or host.

When the host has an LCD or the like as a display device, display of the state information may be achieved by software and may display the state information.

The switching part may be installed in the host, not adapter. In this case, inputting of the switching may be achieved by software.

INDUSTRIAL APPLICABILITY

In the access device and access method to the recording medium of the present invention, the user can designate an area and control methods to be used in the semiconductor memory card. Thus, it is possible to provide the recording medium and access device such as the very convenient large-capacity semiconductor memory card that handles various data. Such recording medium can be used as an information recording medium for digital AV equipment, mobile phone terminals, personal computers, etc.

The invention claimed is:

1. A recording medium access device for accessing a recording medium having a plurality of areas and an area selecting part for selecting one of the areas based on a switching command, comprising:
   a switching part that can be operated from an outside; and
   a card controller for issuing a switching command to switch an area of an attached recording medium according to an operation from said switching part;
   wherein said recording medium access device is an adapter attached to an information processing device for relaying a signal between said information processing device and said recording medium,
   wherein said adapter is used in coupling a plurality of adapters to each other, and
   each adapter has a switching part for independently switching an operation of said recording medium.

2. The recording medium access device according to claim 1, wherein said switching part is a switch part for holding the switched state.

3. The recording medium access device according to claim 2, further comprising a determination part for detecting a state of said switching part at initialization of said recording medium or said recording medium access device and determining whether or not an operation to said recording medium is switched, wherein
   said card controller issues the switching command to said recording medium according to a determination result of said determination part.

4. The recording medium access device according to claim 1, wherein
   said switching part is a switch part for inputting switching.

5. The recording medium access device according to claim 1, wherein
said recording medium has an authentication area requiring mutual authentication with an information processing device, and
said card controller issues a switching command after completion of the mutual authentication.

6. The recording medium access device according to claim 1, wherein
said switching part has a plurality of switching states.

7. The recording medium access device according to claim 6, wherein
said switching part is a switch part for holding the switching states, and,
said card controller detects the switching states of a plurality of said switching parts in a predetermined priority order.

8. The recording medium access device according to claim 1, wherein
said card controller gives priority to one of said adapters adjacent to either of said recording medium or said information processing device over all remaining adapters of said plurality of adapters.

9. The recording medium access device according to claim 1, further comprising a notification determination part for determining whether or not to inform to said information processing device that an operation of said recording medium has been switched, wherein
when determination is made that notification is required by said notification determination part, said card controller informs that the operation of said recording medium has been switched to said information processing device.

10. The recording medium access device according to claim 9, wherein
said notification determination part judges necessity of notification on the basis of setting of said information processing device.

11. The recording medium access device according to claim 1, further comprising an area information storage part for storing operation state of said recording medium therein, wherein
when said switching part is operated, said card controller compares area information stored in said area information storage part and issues a switching command to said recording medium if a change has been occurred.

12. The recording medium access device according to claim 1, further comprising:
a state information storage part for holding state information of said recording medium; and
a display part for displaying an operation state of said information recording medium.

13. The recording medium access device according to claim 1, further comprising a state information storage part for storing state information of said information recording medium therein, wherein
when said switching part is operated, said card controller compares state stored in said state information storage part and issues a switching command to said recording medium if the change has been occurred.

14. A recording medium access method in a recording medium access device for accessing a recording medium having a plurality of areas and an area selecting part for selecting one of the areas based on a switching command, comprising:
a switching step of detecting an input operation from an outside; and
a card control step of issuing a switching command to switch an area of an attached recording medium when said switching step is operated;
wherein said recording medium access device is an adapter attached to an information processing device for relaying a signal between said information processing device and said recording medium,
wherein said adapter is used in coupling a plurality of adapters to each other, and
each adapter has a switching step of independently switching an operation of said recording medium.

15. The recording medium access method according to claim 14, wherein
said switching step holds the switched state.

16. The recording medium access method according to claim 15, further comprising a determination step of detecting the state of said switching step at initialization of said recording medium or said recording medium access device and determining whether or not an operation to said recording medium is switched, wherein
said card control step issues the switching command to said recording medium according to the determination result of said determination part.

17. The recording medium access method according to claim 14, wherein
said switching step is a step of inputting switching.

18. The recording medium access device according to claim 14, wherein
said recording medium has an authentication area requiring mutual authentication with an information processing device, and
said card control step issues a switching command after completion of the mutual authentication.

19. The recording medium access method according to claim 14, wherein
said switching step is a step of inputting by a plurality of switch parts for holding the switching states, and,
said card control step of detecting state of a plurality of said switching parts in a predetermined priority order.

20. The recording medium access method according to claim 14, wherein further comprising a notification determination step of determining whether or not the fact that the operation of said recording medium has been switched is informed to said information processing device, wherein
when determination is made that notification is required by said notification determination part, said card control step informs the fact that the operation of said recording medium has been switched to said information processing device.

21. The recording medium access method according to claim 20, wherein
said notification determination step judges necessity of notification on the basis of setting of said information processing device.

22. The recording medium access method according to claim 14, further comprising an area information storage step of storing operation state of said recording medium, wherein
when said switching part is operated, said card control step compares area information stored in said area information storage step and issues a switching command to said recording medium if a change has been occurred.

23. The recording medium access method according to claim 14, further comprising:
a state information storage step of holding state information of said recording medium; and a display step of displaying an operation state of said information recording medium.

24. The recording medium access method according to claim 14, further comprising a state information storage step of storing the state information of said information recording medium therein, wherein when input is made in said switching step, said card control step compares state stored in said state information storage step and issues a switching command said recording medium if the change has been occurred.

25. A recording medium access device for accessing a recording medium having a plurality of functions comprising:

a switching part that can be operated from an outside; and
a card controller for issuing a switching command to switch an operation of an attached recording medium according to an operation from said switching part;
wherein said recording medium access device is an adapter attached to an information processing device for relaying a signal between said information processing device and said recording medium;
wherein said adapter is used in coupling a plurality of adapters to each other, and
each adapter has a switching part for independently switching an operation of said recording medium.

* * * * *